W. SELLERS.
Iron-Bridges.
No. 136,389. Patented March 4, 1873.
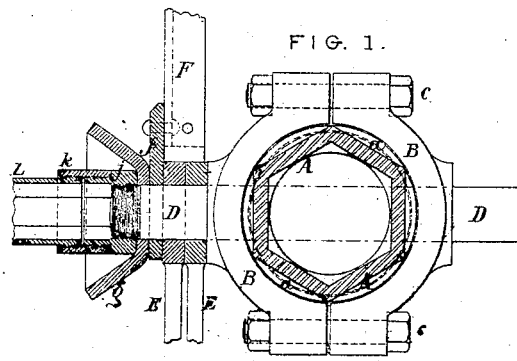
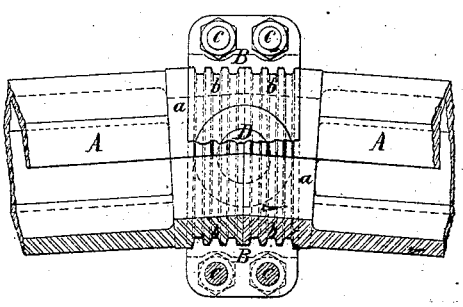
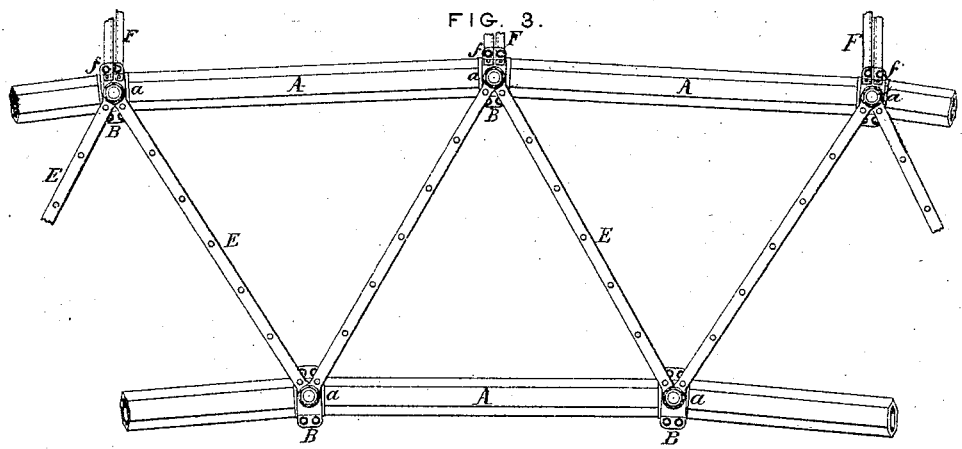
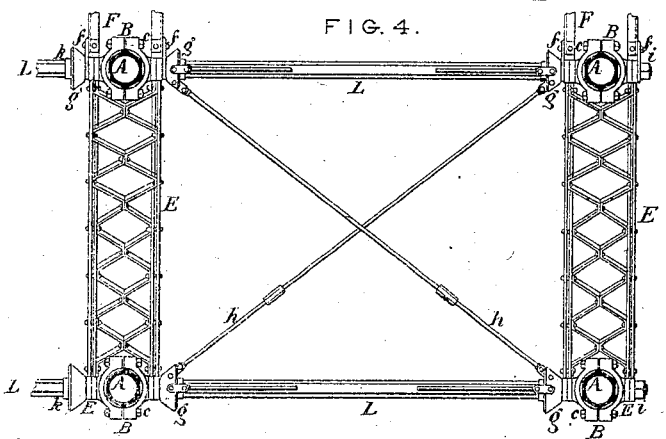
WITNESSES:
Wm. E. Morgan.
Hobart Hatton
INVENTOR:
Wm. Sellers

UNITED STATES PATENT OFFICE.

WILLIAM SELLERS, OF PHILADELPHIA, PENNSYLVANIA.

IMPROVEMENT IN IRON BRIDGES.

Specification forming part of Letters Patent No. 136,389, dated March 4, 1873.

*To all whom it may concern:*

Be it known that I, WILLIAM SELLERS, of the city and county of Philadelphia, in the State of Pennsylvania, have invented certain new and useful Improvements in the Art of Coupling Iron or Steel Tubular Sections of Bridge Arches, of which improvements the following is a specification, reference being had to the accompanying drawing, in which—

Figure 1 is an end elevation of the coupling, showing a section across the tubular arch. Fig. 2 is a longitudinal elevation, partly in section, showing the coupling and a portion of the tubular arch. Fig. 3 represents several of the tubular sections constituting a portion of a compound-arch structure in position. Fig. 4 shows, in transverse section, the compound arch and the manner of securing braces and ties thereon.

In the construction of bridge-arches involving the use of couplings for uniting the ends of the sections, the practice heretofore has been to face off the ends of each section at right angles to its axis, and to interpose between these squared ends of two adjacent sections a wedge-shaped filling-in piece, (technically termed the "voussoir,") the bearing-surfaces of which are beveled to the proper angle to deflect the sections for the construction of an arch of a given radius. Holding this voussoir in place involves increased length and weight of the coupling, and the angular position of the faces and axes of the two adjacent sections to be united increases the mechanical difficulties of constructing and fitting the coupling, and may impair the efficiency of the connection in sustaining the various strains to which it may be subjected.

Now, in contradistinction to the various prior modes of coupling the sections of an arch, in which these sections are deflected by the interposition of a voussoir, the object of my invention is to discard the voussoir entirely and to secure greater simplicity and perfection of the joint with diminished weight and cost of the coupling.

In the accompanying drawing, it will be observed that I have represented the tubular sections A A as having a hexagonal cross-section, and I contemplate using this as being the best form for such structures, but whatever may be their general form I make them cylindrical for a distance from each end sufficient to afford clamping-surface for the coupling, and give to the ends $a$ $a$ a plane surface radial to the center of the arch, so that in all cases the two cylindrical ends when in position to be coupled will have a common axis tangential to the arc of the structure. The divergence of these cylindrical ends from the axis of the tubular section can be accurately measured and uniformly produced to any required angle, by upsetting the ends in a form and dressing them by suitable shaping machinery. Each of these cylindrical ends is provided with grooves $b$ $b$, Fig. 2. The coupling is formed of two halves, B B, drawn together by clamping-bolts $c$ $c$, or united in any other manner that may be better adapted to the conditions then present, and the inner surface of this coupling is grooved conformably to the grooves in the cylindrical ends of the sections A A. The sides of the grooves in the couplings and in the arch sections are slightly beveled, and so placed relatively to each other that the clamping of the two halves of the coupling in position will cause the surfaces to bind laterally before the projections on the coupling B B come in contact with the bottom of the grooves $b$ $b$ in the cylindrical ends.

This manner of coupling not only ties the two sections well together longitudinally, but is equally secure against any tensile strain in the lower side of the arch, or against lateral vibrations of the structure.

The length of this coupling through its axis is obviously greatly lessened and its weight proportionately reduced by dispensing with the voussoir; while it is still another advantage of great practical value, that any number of these couplings of a given diameter remain uniform and interchangeable throughout, irrespective of the degree of deflection at each coupling, the greater or lesser amount of deflection only affecting the deviation of the axis of the grooved cylindrical end from the main axis of the section, while perfect uniformity in all other respects may be adhered to in the dimensions of the couplings and the parts relating thereto.

In using rolled cylindrical or hexagonal tubular sections in the construction of the arch, the ends of these sections should be swelled by upsetting, to provide the requisite thickness of metal and sectional area in the grooved portion of the cylindrical end without any necessity for this additional metal throughout the length of the section.

I provide as a very convenient and efficient fastening for the various ties, struts, and braces entering into the compound-arch structure, trunnion projections D D extending from each half of the coupling in a line perpendicular to their plane of separation. In the annexed drawing these trunnion-like projections are represented as carrying on opposite sides of the arch the ends of the main oblique ties E E, and next to these the projections D D receive the eye-pieces $f$ of the suspension-rods F F. On the inner side of the arch the eye-piece $f$ is followed by a cup-shaped washer, $g$, to which the various diagonal tension-braces $h\ h$ are conveniently fastened, as shown at Fig. 4. The screw ends of the projections D D receive on the outer side of the compound arch a plain nut, $i$, Fig. 4, binding the several parts above mentioned in place, and on the inner side a screw-socket, $j$, Fig. 1, takes the place of the nut, and serves to secure, by means of a sleeve, $k$, the transverse strut L, as shown in Fig. 1.

In place of the trunnions D projecting from the halves of the coupling, and forming a part of them, I contemplate using another construction of this feature of my invention—that is, a continuous separate pin extending transversely through the coupling, perpendicularly to its plane of separation, as shown by dotted lines in Fig. 1.

The general arrangement and construction in detail of the fastenings of the several ties and struts do not enter into the subject of my present improvements, and may be modified to any extent without departing from my invention.

What I claim as my invention, and desire to secure by Letters Patent, is—

1. A tubular section of a bridge-arch, constructed with the planes of its end surfaces radial to the center of the arch and with its ends formed as cylinders, the axes of which are perpendicular to the planes of the end surfaces, substantially as described.

2. The combination of two tubular sections and their coupling, substantially as set forth, so that the portion of each section embraced by the coupling and the coupling itself shall have a a common axis.

3. The combination of the grooved cylindrical ends of tubular sections of a bridge-arch with the grooved clamping coupling, substantially as set forth.

4. The combination, with the coupling B B, of the trunnions or their equivalent the pin D, for the purposes described.

WM. SELLERS.

Witnesses:
WM. E. MORGAN,
WM. S. LYNN.